United States Patent
Mishima et al.

(10) Patent No.: US 10,967,681 B2
(45) Date of Patent: Apr. 6, 2021

(54) TIRE

(71) Applicant: SUMITOMO RUBBER INDUSTRIES, LTD., Kobe (JP)

(72) Inventors: Mari Mishima, Kobe (JP); Yoshiaki Kanematsu, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 506 days.

(21) Appl. No.: 15/866,066

(22) Filed: Jan. 9, 2018

(65) Prior Publication Data

US 2018/0201071 A1 Jul. 19, 2018

(30) Foreign Application Priority Data

Jan. 18, 2017 (JP) .............................. JP2017-006911

(51) Int. Cl.
| | | |
|---|---|---|
| *B60C 11/12* | (2006.01) | |
| *B60C 11/13* | (2006.01) | |
| *B60C 11/03* | (2006.01) | |

(52) U.S. Cl.
CPC ...... *B60C 11/0309* (2013.01); *B60C 11/0304* (2013.01); *B60C 11/0306* (2013.01);
(Continued)

(58) Field of Classification Search
CPC ............ B60C 11/0304; B60C 11/0306; B60C 11/1369; B60C 11/12; B60C 11/1218;
(Continued)

(56) References Cited

U.S. PATENT DOCUMENTS

D345,535 S * 3/1994 Shinohara ..................... D12/603
D345,952 S * 4/1994 Christenbury ............... D12/601
(Continued)

FOREIGN PATENT DOCUMENTS

DE 3539530 A1 * 5/1986
EP 2 233 321 A1 9/2010
(Continued)

OTHER PUBLICATIONS

Translation for Japan 63-137003 (Year: 2020).*
(Continued)

*Primary Examiner* — Steven D Maki
(74) *Attorney, Agent, or Firm* — Birch, Stewart, Kolasch & Birch, LLP

(57) ABSTRACT

A tire includes a tread portion being provided with a crown main groove and a shoulder main groove to form a middle land portion therebetween. The middle land portion is provided with a plurality of middle lateral grooves to divide the middle land portion into a plurality of middle blocks. The plurality of middle lateral grooves includes a plurality of first middle lateral grooves each including a first inner inclined element extending from the crown main groove and inclined with respect to a tire axial direction, a first outer inclined element extending from the shoulder main groove and inclined with respect to the tire axial direction in a same direction as the first inner inclined element, and a first intermediate inclined element connecting the first inner inclined element with the first outer inclined element and inclined in an opposite direction to the first inner inclined element.

16 Claims, 7 Drawing Sheets

(52) U.S. Cl.
CPC .......... *B60C 11/12* (2013.01); *B60C 11/1218* (2013.01); *B60C 11/1236* (2013.01); *B60C 11/1263* (2013.01); *B60C 11/1353* (2013.01); *B60C 11/1369* (2013.01); *B60C 2011/0369* (2013.01); *B60C 2011/0372* (2013.01); *B60C 2011/0383* (2013.01); *B60C 2011/0388* (2013.01); *B60C 2011/1213* (2013.01)

(58) Field of Classification Search
CPC ............ B60C 11/1236; B60C 11/1263; B60C 2011/0369; B60C 2011/0381; B60C 2011/0383; B60C 2011/1213
See application file for complete search history.

(56) References Cited

U.S. PATENT DOCUMENTS

| | | | | |
|---|---|---|---|---|
| 5,814,169 | A | * | 9/1998 | Yamaguchi ............ B60C 11/11 152/209.22 |
| D492,932 | S | * | 7/2004 | Kindig .................... D12/588 |
| D734,714 | S | * | 7/2015 | Grote ...................... D12/590 |
| D761,195 | S | * | 7/2016 | Shin ....................... D12/601 |
| 2003/0029537 | A1 | * | 2/2003 | Iwamura ............... B60C 11/12 152/209.18 |
| 2004/0020577 | A1 | * | 2/2004 | Hirai ................... B60C 11/0318 152/526 |
| 2014/0230983 | A1 | * | 8/2014 | Tagashira ........... B60C 11/0306 152/209.23 |
| 2016/0332489 | A1 | * | 11/2016 | Sanae ................. B60C 11/0332 |

FOREIGN PATENT DOCUMENTS

| | | |
|---|---|---|
| EP | 2 578 418 A1 | 4/2013 |
| EP | 2 610 081 A2 | 7/2013 |
| JP | 63-137003 A * | 6/1988 |
| JP | 2002-046426 A * | 2/2002 |
| JP | 2012-179965 A | 9/2012 |

OTHER PUBLICATIONS

Machine translation for German 3,539,530 (Year: 2020).*
Machine translation for Japan 2002-046426 (Year: 2020).*
Extended European Search Report issued in corresponding European Application No. 17211101.5 dated May 30, 2018.

* cited by examiner

TIRE

BACKGROUND ART

Field of the Invention

The present disclosure relates to tires, and more particularly to a tire capable of improving steering stability on dry road condition and driving performance on ice and snow road conditions.

Description of the Related Art

Conventionally, Japanese Unexamined Patent Application Publication 2012-179965 discloses a tire which includes a tread portion provided with a plurality of circumferentially and continuously extending main grooves to form land regions on the tread portion and a plurality of lateral grooves to divide the land regions into a plurality of blocks. The lateral grooves may be helpful to improve driving performance on wet, ice and snow road conditions, while the lateral grooves may cause reduction in rigidity of the land regions, and resulting in deterioration of steering stability on dry road condition.

SUMMARY OF THE INVENTION

The present disclosure has been made in view of the above circumstances and has an object to provide tires capable of improving steering stability on dry road condition and driving performance on ice and snow road conditions.

In one aspect of the disclosure, a tire includes a tread portion being provided with a plurality of circumferentially extending main grooves including a crown main groove and a shoulder main groove to form a middle land portion therebetween. The middle land portion is provided with a plurality of middle lateral grooves to divide the middle land portion into a plurality of middle blocks. The plurality of middle lateral grooves includes a plurality of first middle lateral grooves each including a first inner inclined element extending from the crown main groove and inclined with respect to a tire axial direction, a first outer inclined element extending from the shoulder main groove and inclined with respect to the tire axial direction in a same direction as the first inner inclined element, and a first intermediate inclined element connecting the first inner inclined element with the first outer inclined element and inclined in an opposite direction to the first inner inclined element.

In another aspect of the disclosure, the first inner inclined element may be configured as a shallow bottom portion, and the first outer inclined element and the first intermediate inclined element each may be configured as a deep bottom portion having a depth greater than that of the shallow bottom portion.

In another aspect of the disclosure, the plurality of middle lateral grooves may further includes a plurality of second middle lateral grooves each including a second inner inclined element extending from the crown main grooves and inclined with respect to the tire axial direction in a same direction as the first inner inclined element, a second outer inclined element extending from the shoulder main groove and inclined with respect to the tire axial direction in a same direction as the second inner inclined element and a second intermediate inclined element connecting the second inner inclined element with the second outer inclined element and inclined in an opposite direction to the second inner inclined element. The second inner inclined element and the second intermediate inclined element each may be configured as a deep bottom portion. The second outer inclined element may be configured as a shallow bottom portion having a depth smaller than that of the deep bottom portion of the second inner inclined element and the second intermediate inclined element.

In another aspect of the disclosure, the plurality of first middle lateral grooves and the plurality of second middle lateral grooves may be arranged alternately in a tire circumferential direction.

In another aspect of the disclosure, the first intermediate inclined element may be located in such a manner as not to overlap with the second intermediate inclined element when the first intermediate inclined element is projected onto the second middle lateral groove in the tire circumferential direction.

In another aspect of the disclosure, the plurality of second middle lateral grooves may be formed in a point-symmetrical shape to the plurality of first middle lateral grooves.

In another aspect of the disclosure, the shallow bottom portion may have a length (La) in the tire axial direction greater than a length (Lb) in the tire axial direction of the deep bottom portion.

In another aspect of the disclosure, at least one of the plurality of middle blocks may be provided with a middle sipe traversing completely the at least one of the middle blocks. The middle sipe may include an inner sipe element extending from the crown main groove and inclined with respect to the tire axial direction in a same direction as the first inner inclined element, an outer sipe element extending from the shoulder main groove and inclined with respect to the tire axial direction in a same direction as the first outer inclined element and an intermediate sipe element connecting the inner sipe element with the outer sipe element and inclined with respect to the tire axial direction in a same direction as the first intermediate inclined element. The intermediate sipe element may have a depth shallower than depths of the inner sipe element and the outer sipe element.

In another aspect of the disclosure, each of a length (Lo) in the tire axial direction of the outer sipe element and a length (Lm) in the tire axial direction of the intermediate sipe element may be within a range of 100% plus/minus 5% of a length (Li) in the tire axial direction of the inner sipe element.

In another aspect of the disclosure, a difference (Db-Da) between a depth (Db) of the deep bottom portion and a depth (Da) of the shallow bottom portion may be equal to or more than 15% of a depth (D1) of the crown main groove.

In another aspect of the disclosure, the at least one of the middle blocks may be provided with an outer closed middle sipe extending from the shoulder main groove along an extension line of the inner sipe element of the middle sipe and terminated within the at least one of the middle blocks and an inner closed middle sipe extending from the crown main groove along an extension line of the outer sipe element of the middle sipe and terminated within the at least one of the middle blocks.

In another aspect of the disclosure, the outer closed middle sipe and the inner closed middle sipe each may be configured as a three-dimensional sipe.

In another aspect of the disclosure, the first inner inclined element may be configured as a shallow bottom portion, and the first outer inclined element and the first intermediate inclined element each may be configured as a deep bottom portion having a depth greater than that of the shallow bottom portion, and the outer closed middle sipe and the inner closed middle sipe each may have a depth greater than a depth (Db) of the deep bottom portion.

In another aspect of the disclosure, the tread portion may further include a crown land portion disposed inwardly in the tire axial direction of the middle land portion.

The crown land portion may be provided with a plurality of crown lateral grooves each extending from the crown main groove and terminated within the crown land portion, and each of opening ends of the plurality of crown lateral grooves at the crown main groove may face each of the opening ends of the plurality of middle lateral grooves at the crown main groove in the tire axial direction.

DESCRIPTION OF THE PREFERRED EMBODIMENTS

An embodiment of the present disclosure will be explained below with reference to the accompanying drawings.

Figure 1:
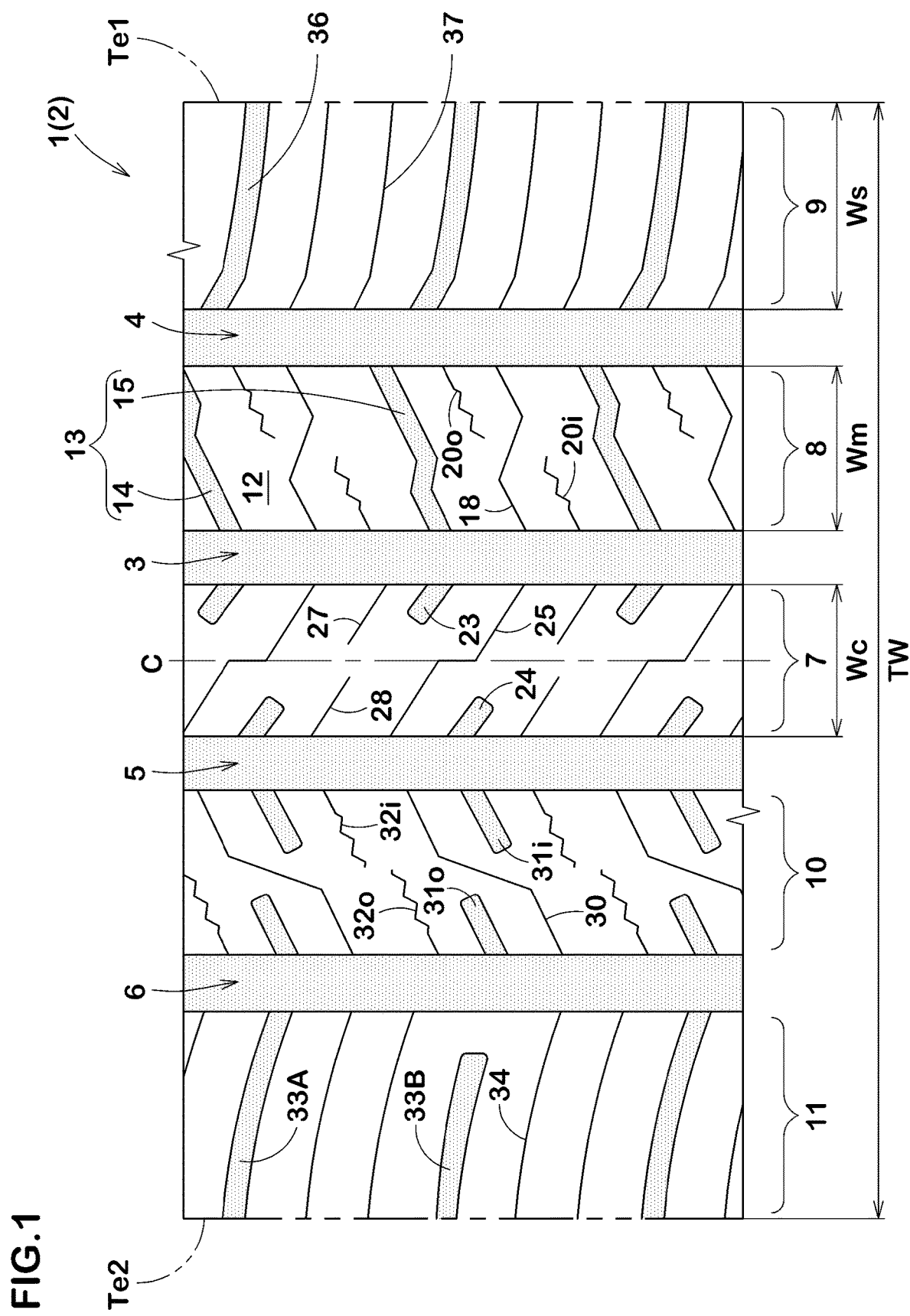
FIG. 1 is a development view of a tread portion of a tire according to an embodiment of the present disclosure.

FIG. 1 illustrates a development view of a tread portion 2 of a tire 1 according to an embodiment of the present disclosure. The tire in accordance with the present disclosure may be embodied as various kinds of tires such as a pneumatic tire for passenger car or heavy duty vehicle and a non-pneumatic tire which is not filled with compressed air therein (e.g. an airless tire). In FIG. 1, the tire 1 is embodied as an all-season tire for passenger car, for example.

As illustrated in FIG. 1, in this embodiment, the tread portion 2 includes an asymmetrical tread pattern which has a designated mounting direction to a vehicle. In this embodiment, as shown in FIG. 1, the tread portion 2 includes a first tread edge (Te1), which is illustrated on the right side, to be located on an inboard of a vehicle when the tire 1 is mounted on the vehicle, and a second tread edge (Te2), which is illustrated on the left side, to be located on an outboard of the vehicle when the tire 1 is mounted on the vehicle. Note that the present disclosure is not limited to such an aspect, but can also be embodied as a tire which has no designated mounting direction to a vehicle.

As used herein, the first tread edge (Te1) and the second tread edge (Te2) refer to axially outermost edges of the ground contacting patch of the tread portion 2 which occurs under a standard condition with a standard tire load when the camber angle of the tire is set to zero. Further, an axial distance between the first tread edge (Te1) and the second tread edge (Te2) is referred to a tread width TW.

The standard condition is such that the tire 1 is mounted on a standard wheel rim with a standard pressure, but is loaded with no tire load. In this application including specification and claims, various dimensions, positions and the like of the tire 1 refer to those under the standard condition of the tire unless otherwise noted.

As used herein, the standard wheel rim is a wheel rim officially approved for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is a tire load officially approved or recommended for the tire by standards organizations, wherein the standard tire load is the "maximum load capacity" in JATMA, the "Load Capacity" in ETRTO, and the maximum value given in the above-mentioned table in TRA or the like.

In this embodiment, the tread portion 2 is provided with a plurality of circumferentially and continuously extending main grooves. The plurality of main grooves may include a first crown main groove 3 and a first shoulder main groove 4 which are arranged between the tire equator C and the first tread edge Te1, and a second crown main groove 5 and a second shoulder main groove 6 which are arranged between the tire equator C and the second tread edge Te2.

Preferably, the first and second shoulder main grooves 4 and 6, for example, may be located such that the respective groove centerline is away from the tire equator C at a distance in a range of from 0.20 to 0.35 times the tread width TW. Preferably, the first and second crown main grooves 3 and 5, for example, may be located such that the respective groove centerline is away from the tire equator C at a distance in a range of from 0.05 to 0.15 times the tread width TW.

Preferably, each groove width of the main grooves 3 to 6, for example, may be in a range of from 3% to 7% of the tread width TW. Preferably, each depth of the main grooves 3 to 6, in case of passenger car tire for example, may be in a range of from 5 to 10 mm. Note that the specification of the main grooves is not limited to the above ranges.

The tread portion 2 is divided into a plurality of land portions by the main grooves 3 to 6. Specifically, the plurality of land portions may include a crown land portion 7, a first middle land portion 8, a second middle land portion 10, a first shoulder land portion 9 and a second shoulder land portion 11.

The crown land portion 7 is disposed between the first crown main groove 3 and the second crown main groove 5. The first middle land portion 8 is disposed between the first crown main groove 3 and the first shoulder main groove 4. The first shoulder land portion 9 is disposed outwardly in the tire axial direction of the first shoulder main groove 4. The second middle land portion 10 is disposed between the second crown main groove 5 and the second shoulder main groove 6. The second shoulder land portion 11 is disposed outwardly in the tire axial direction of the second shoulder main groove 6.

Preferably, the width We in the tire axial direction of the crown land portion 7, for example, may be in a range of from 0.10 to 0.15 times the tread width TW. Preferably, the widths Wm in the tire axial direction of the first middle land portion 8 and the second middle land portion 10 may be in a range of from 0.10 to 0.20 times the tread width TW. Preferably, the widths Ws in the tire axial direction of the first shoulder land portion 9 and the second shoulder land portion 11 may be in a range of from 0.15 to 0.25 times the tread width TW.

The first middle land portion 8 is provided with a plurality of middle lateral grooves 13 which traverses completely thereon to divide the first middle land portion 8 into a plurality of middle blocks 12. In some preferred embodiments, the middle lateral grooves 13 include first middle lateral grooves 14 and second middle lateral grooves 15 which are arranged alternately in the tire circumferential direction.

Figure 2:
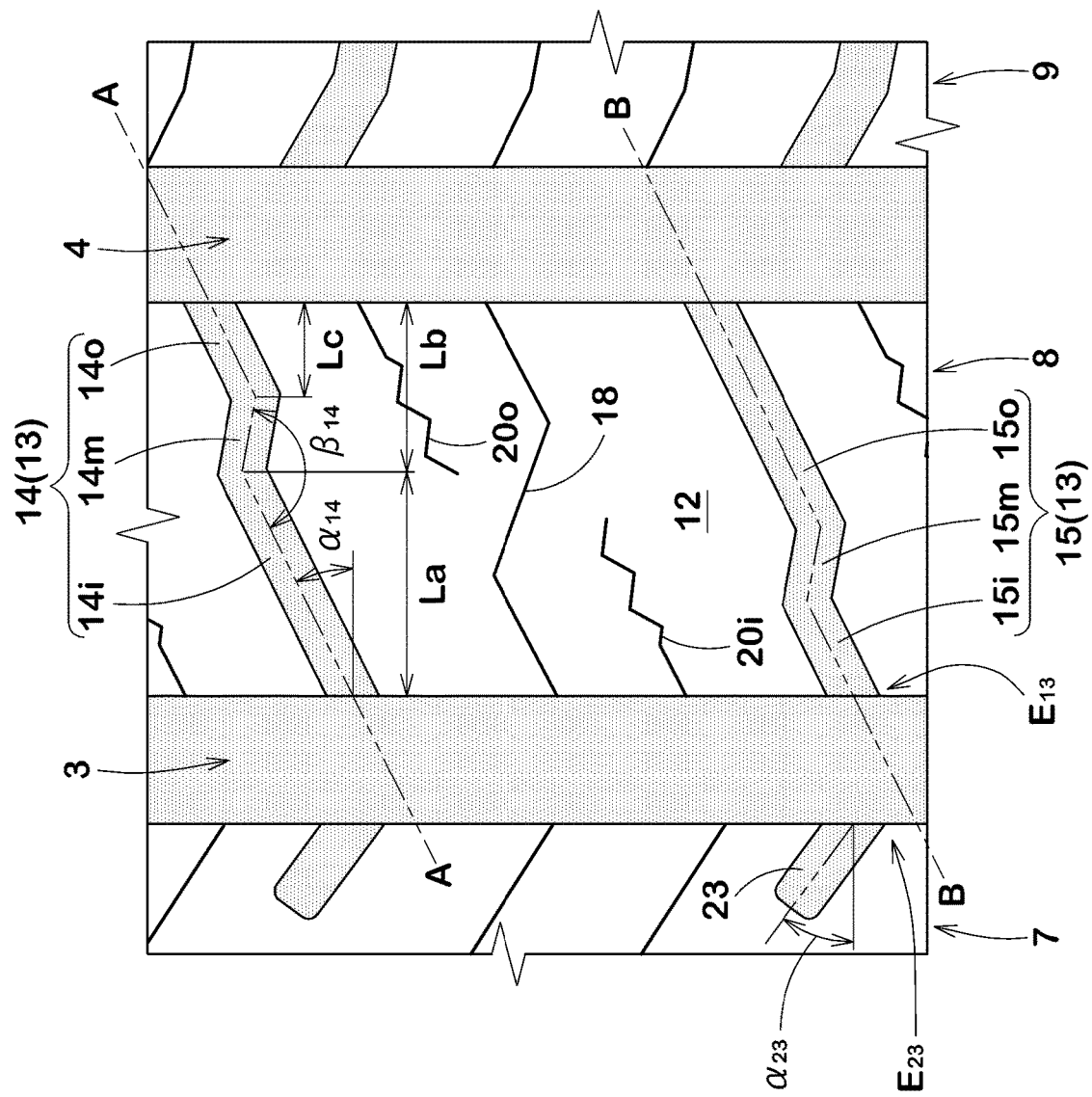
FIG. 2 is an enlarged view of a first middle land portion.

FIG. 2 illustrates an enlarged view of the first middle land portion 8. As illustrated in FIG. 2, each first middle lateral groove 14 includes a first inner inclined element 14i, a first outer inclined element 14o and a first intermediate inclined element 14m. In this embodiment, each first middle lateral groove 14 consists of the first inner inclined element 14i, the first outer inclined element 14o and the first intermediate inclined element 14m.

The first inner inclined element 14i extends from the first crown main groove 3, and is inclined with respect to the tire axial direction. The first outer inclined element 14o extends from the first shoulder main groove 4, and is inclined with respect to the tire axial direction in the same direction as the first inner inclined element 14i, e.g. upward right direction in FIGS. 1 and 2. The first intermediate inclined element 14m connects the first inner inclined element 14i with the first outer inclined element 14o. The first intermediate inclined element 14m is inclined in an opposite direction to the first inner inclined element 14i and the first outer inclined element 14o with respect to the tire axial direction, e.g. downward right direction in FIGS. 1 and 2.

In this embodiment, the first inner inclined element 14i and the first outer inclined element 14o are inclined at the same angle α14 with respect to the tire axial direction. Preferably, the angle α14 may be in a range of from 20 to 30 degrees, for example, in order to improve grip performance on ice and snow road conditions in both tire axial and circumferential directions with a good balance. Preferably, in view of the same reason, an angle β14 between the first inner inclined element 14i and the first intermediate inclined element 14m may be in a range of from 140 to 150 degrees.

Figure 3A:
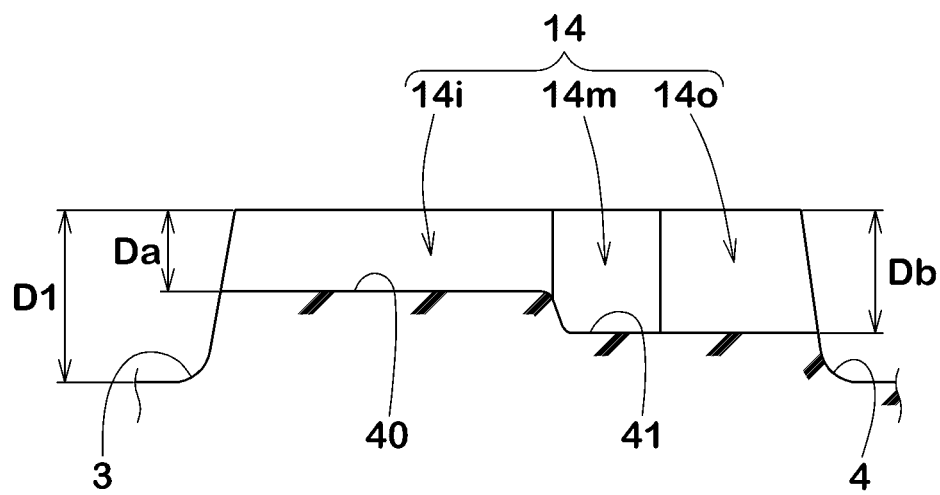
FIG. 3A and FIG. 3B are respectively cross-sectional views taken along line A-A and line B-B of FIG. 2.

FIG. 3A illustrates a cross-sectional view of the first middle lateral groove 14 taken along line A-A of FIG. 2. As illustrated in FIG. 3A, the first middle lateral grooves 14 includes a shallow bottom portion 40 disposed on the side of the first crown main groove 3 and a deep bottom portion 41 disposed on the side of the first shoulder main groove 4 and having a depth greater than that of the shallow bottom portion 40. More specifically, in this embodiment, the first inner inclined element 14i forms the shallow bottom portion 40, and both first outer inclined element 14o and first intermediate inclined element 14m form the deep bottom portion 41.

Preferably, the difference (Db-Da) between a depth Db of the deep bottom portion 41 and a depth Da of the shallow bottom portion 40 may be equal to or more than 15% of a depth D1 of the crown main groove 3. Further, the depth Db may preferably be in a range of from 65% to 75% of the depth D1, and the depth Da may preferably be in a range of from 45% to 55% of the depth D1.

Referring back to FIG. 2, each of the second middle lateral grooves 15 includes a second inner inclined element 15i, a second outer inclined element 15o and a second intermediate inclined element 15m. The second inner inclined element 15i extends from the first crown main groove 3, and is inclined in the same direction as the first inner inclined element 14i with respect to the tire axial direction. The second outer inclined element 15o extends from the first shoulder main groove 4, and is inclined in the same direction as the first outer inclined element 14o with respect to the tire axial direction. The second intermediate inclined element 15m is inclined in the same direction as the first intermediate inclined element 14m with respect to the tire axial direction, and connects the second inner inclined element 15i with the second outer inclined element 15o.

Figure 3B:
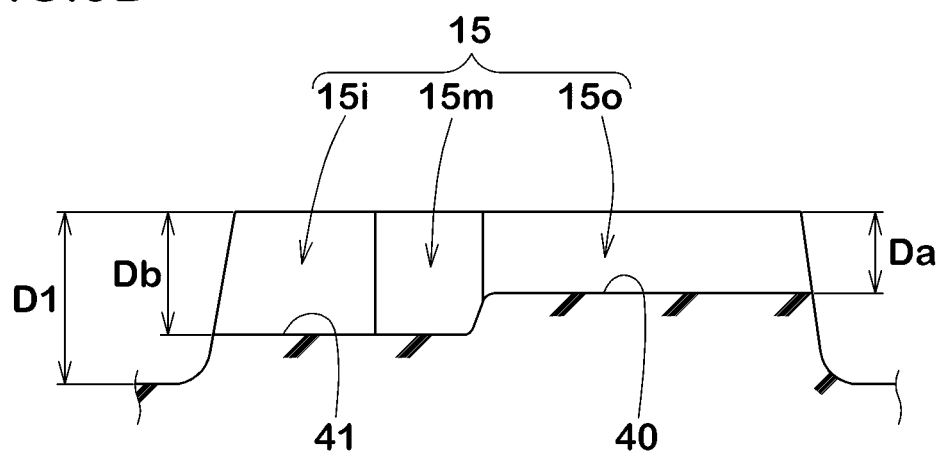

FIG. 3B illustrates a cross-sectional view of the second middle lateral groove 15 taken along line B-B of FIG. 2. As illustrated in FIG. 3B, in the second middle lateral groove 15 in accordance with the present disclosure, both second inner inclined element 15i and second intermediate inclined element 15m form the deep bottom portion 41. Further, the second outer inclined element 15o forms the shallow bottom portion 40 having a depth smaller than that of the deep bottom portion 41.

As illustrated in FIG. 2, the second middle lateral groove 15 may be formed in a point-symmetrical shape to the first middle lateral groove 14. That is, the second middle lateral groove 15 may have the same shape as a shape in which the first middle lateral groove 14 is rotated at an angle of 180 degrees around a point.

Regarding the above point symmetrical shape, the second inner inclined element 15i, the second outer inclined element 15o and the second intermediate inclined element 15m of the second middle lateral groove 15 respectively correspond to the first outer inclined element 14o, the first inner inclined element 14i and the first intermediate inclined element 14m of the first middle lateral groove 14.

As described above, at least the first middle lateral grooves 14, preferably both first and second middle lateral grooves 14 and 15 in this embodiment, are bent in a zigzag manner. Thus, since groove edge components in the tire circumferential and axial directions may be increased, scratching and digging friction against the ground may also be increased in the tire circumferential and axial directions, leading to improve driving performance on ice condition. Further, since the first and second middle lateral grooves 14 and 15 are bent in a zigzag manner, bottoms of these grooves tend to hardly deform, and thus force acting on the tire can be dispersed widely in the first middle land portion 8. Consequently, the tire in accordance with the present disclosure may deliver an excellent steering stability on dry road condition and may suppress reduction in rigidity of the first middle land portion 8 while maintaining sufficient groove edge components.

Furthermore, in this embodiment, since the first and second middle lateral grooves 14 and 15 are arranged alternately in the tire circumferential direction, the shallow bottom portions 40 and the deep bottom portions 41 are arranged in a zigzag manner in the tire circumferential direction. Thus, as compared with a configuration of constant groove depths, reduction in rigidity of the first middle land portion may further be suppressed, leading to further improve steering stability on dry road condition. Furthermore, driving performance on ice and snow road conditions may further be improved since better groove edge effect can be exerted by being suppressed reduction in rigidity of the first middle land portion.

Furthermore, the above arrangement of the shallow bottom portion 40 and the deep bottom portion 41 may exhibit high resistance to torsional deformation of the first middle land portion 8. Thus, tread chunking due to the torsional deformation may be suppressed, leading to improve durability of the tire. Note that the first intermediate inclined element 14m is preferably located in such a manner as not to overlap with the second intermediate inclined element 15m when the first intermediate inclined element 14m is projected onto the second intermediate inclined element 15m in the tire circumferential direction.

When the difference Db−Da between the depth Db of the deep bottom portion 41 and the depth Da of the shallow bottom portion 40 is equal to or more than 15% of the depth D1 of the first crown main groove 3, effect of the above arrangement of the shallow bottom portions 40 and the deep bottom portions 41 may be higher, and thus rigidity of the first middle land portion 8 can be maintained sufficiently, leading to further improve steering stability on dry road condition while suppressing chunking.

As illustrated in FIG. 2, in each of the first middle lateral groove 14 and the second middle lateral groove 15, the length La in the tire axial direction of the shallow bottom portion 40 may preferably be greater than the length Lb in the tire axial direction of the deep bottom portion 41. When the length La is greater than the length Lb, rigidity of the first and second middle lateral grooves 14 and 15 can be ensured since shallow bottom portions 40 may form middle regions in the tire axial direction thereof which are supposed to be portions having low rigidity. Thus, rigidity of the first middle land portion 8 may further be suppressed. Preferably, the length La of each shallow bottom portion 40 may be equal to or less than 55% of the width Wm of the first middle land portion 8. Preferably, the lengths Lc in the tire axial direction of each of the first outer inclined element 14o and the second inner inclined element 15i may be in a range of from 30% to 35% of the width Wm.

In this embodiment, at least one of middle blocks 12 is provided with a middle sipe 18 traversing the at least one of middle blocks 12, an inner closed middle sipe 20i and an outer closed middle sipe 20o.

Figure 4:
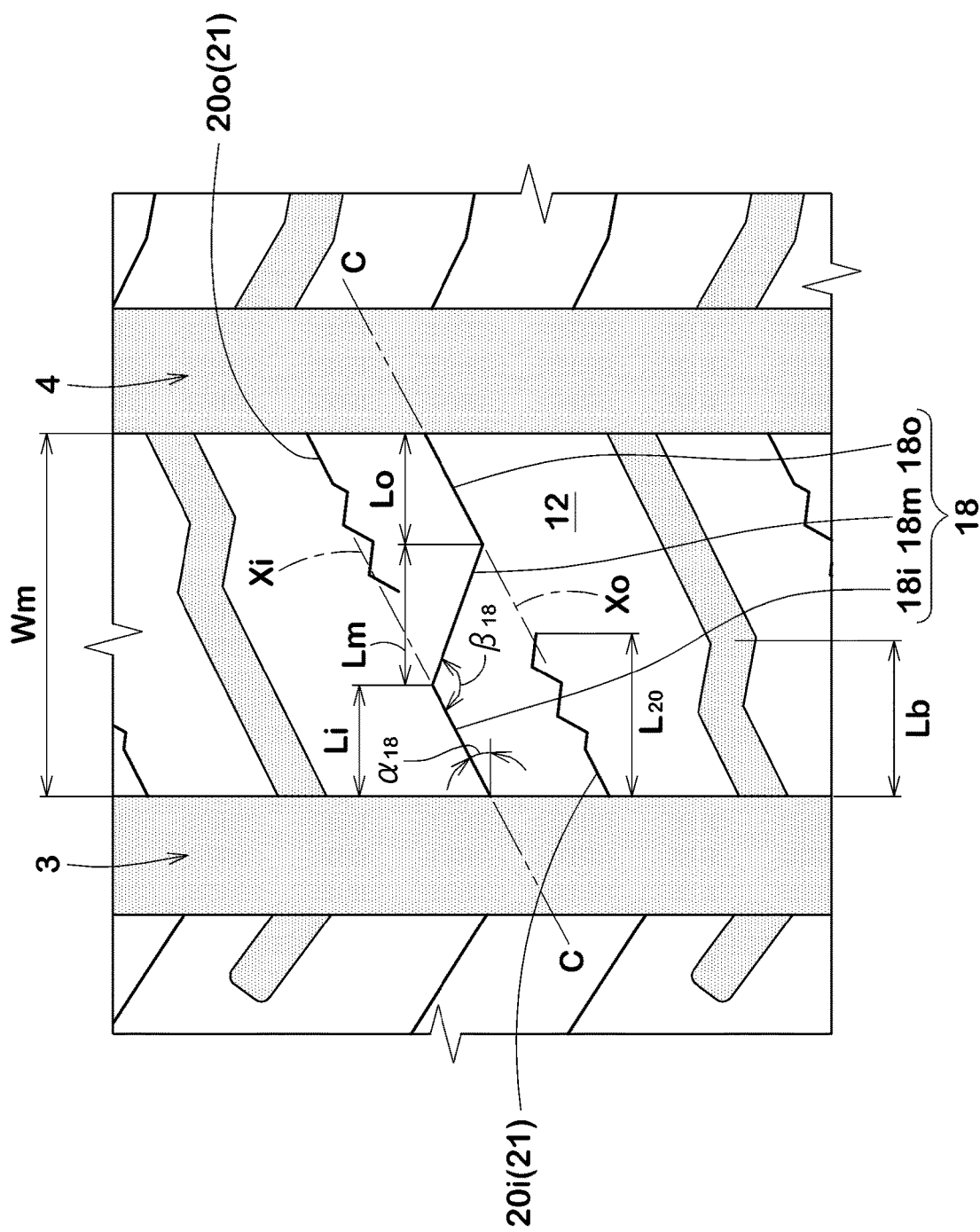
FIG. 4 is an enlarged view of the first middle land portion.

As illustrated in FIG. 4, the middle sipe 18 includes an inner sipe element 18i, an outer sipe element 18o and an intermediate sipe element 18m. The inner sipe element 18i extends from the first crown main groove 3, and is inclined with respect to the tire axial direction in the same direction as the first inner inclined element 14i. The outer sipe element 18o extends from the first shoulder main groove 4, and is inclined with respect to the tire axial direction in the same direction as the first outer inclined element 14o. The intermediate sipe element 18m is inclined with respect to the tire axial direction in the same direction as the first intermediate inclined element 14m, and connects the inner sipe element 18i with the outer sipe element 18o.

In this embodiment, the inner sipe element 18i and the outer sipe element 18o have the same angle α18 with respect to the tire axial direction. Preferably, the angle α18 may be in a range of from 20 to 30 degrees in order to exert edge effect of the sipe both tire axial direction and tire circumferential direction in a good balanced manner on ice and snow road conditions. Further, the angle β18 between the inner sipe element 18i and the intermediate sipe element 18m may be smaller than the angle β14. Preferably, the angle β18 may be in a range of from 130 to 140 degrees.

Figure 5:
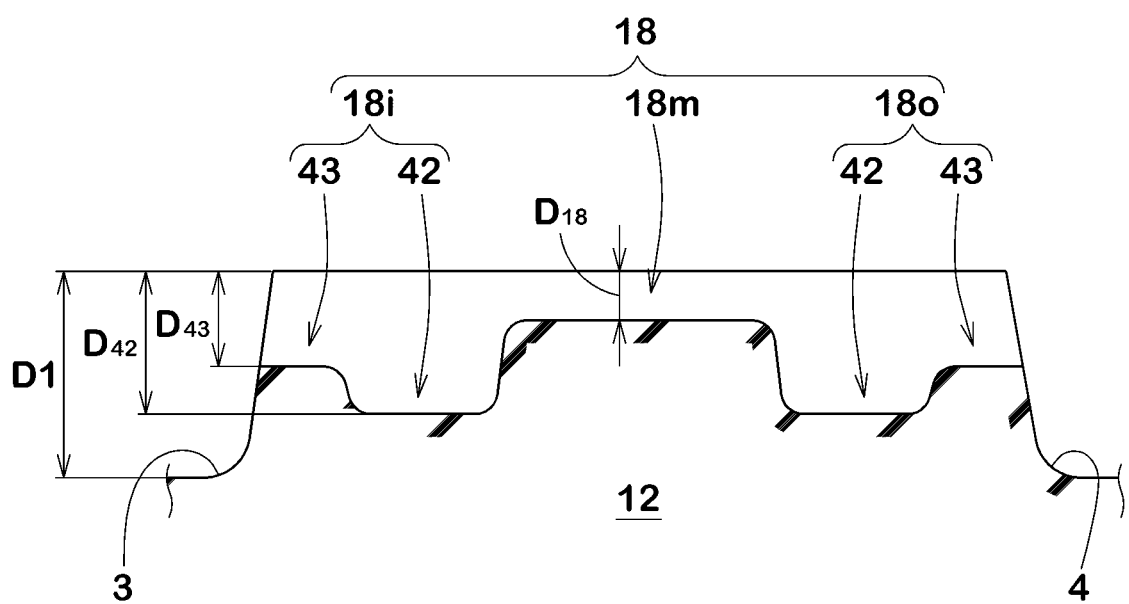
FIG. 5 is a cross-sectional view taken along line C-C of FIG. 4.

FIG. 5 illustrates a cross-sectional view of the middle sipe 18 taken along line C-C of FIG. 4. As illustrated in FIG. 5, in the middle sipe 18, the intermediate sipe element 18m has a depth shallower than those of the inner sipe element 18i and the outer sipe element 18o. In this embodiment, each of the inner sipe element 18i and the outer sipe element 18o has a deep bottom portion 42 and a shallow bottom portion 43 having a depth smaller than that of the deep bottom portion 42. Each shallow bottom portion 43 is arranged on both ends side of the middle sipe 18. Each deep bottom portion 42 is arranged between the intermediate sipe element 18m and each respective shallow bottom portion 43. The middle sipe 18 thus may be helpful to maintain rigidity of the at least one of middle blocks 12 due to the intermediate sipe element 18m and the shallow bottom portion 43.

Preferably, the depth D18 of the intermediate sipe element 18m may be in a range of from 0.45 to 0.50 times the depth D1 of the first crown main groove 3. Preferably, the depth D42 of each deep bottom portion 42 may be in a range of from 0.65 to 0.70 times the depth D1 of the first crown main groove 3. Preferably, the depth D43 of each shallow bottom portion 43 may be greater than the depth D18, but smaller than the depth D42.

As illustrated in FIG. 4, the length Lo in the tire axial direction of the outer sipe element 18o and the length Lm in the tire axial direction of the intermediate sipe element 18m may preferably be within a range of 100% plus/minus 5% of the length Li in the tire axial direction of the inner sipe element 18i. That is, the inner sipe element 18i, the outer sipe element 18o and the intermediate sipe element 18m are configured to have an approximately same length, leading to optimize rigidity of the at least one of middle blocks 12.

Since the middle sipe 18 increases sipe edge components of the tire circumferential direction as well as the tire axial direction, driving performance on ice and snow road conditions may be improved. Further, in the middle sipe 18 having a zigzag manner, since sipe walls thereof can engage with each other upon grounding, rigidity of the at least one middle blocks may be maintained even when the middle sipe 18 traverses completely the first middle land portion 8.

The outer closed middle sipe 20o extends from the first shoulder main groove 4 along an extension line Xi of the inner sipe element 18i of the middle sipe 18, and terminates within the at least one of middle blocks 12. Further, the inner closed middle sipe 20i extends from the first crown main groove 3 along an extension line Xo of the outer sipe element 18o of the middle sipe 18, and terminates within the at least one of middle blocks 12. Note that "extend . . . along the extension line Xi or Xo" means the concerned sipe 20o or 20i respectively extends on the extension line Xi or Xo, or in parallel with the extension line Xi or Xo, wherein "in parallel with" means that the concerned sipe 20o or 20i respectively extends not only just parallel with the extension line Xi or Xo, but also extends with an angle difference to the extension line Xi or Xo within 5 degrees.

Preferably, the lengths L20 in the tire axial direction of the inner closed middle sipe 20i and the outer closed middle sipe 20o may be equal to or less than 50% of the width Wm of first middle land portion 8, and more preferably, the lengths L20 may be within a range of 100% plus/minus 5% of the length Lb.

Figure 6:
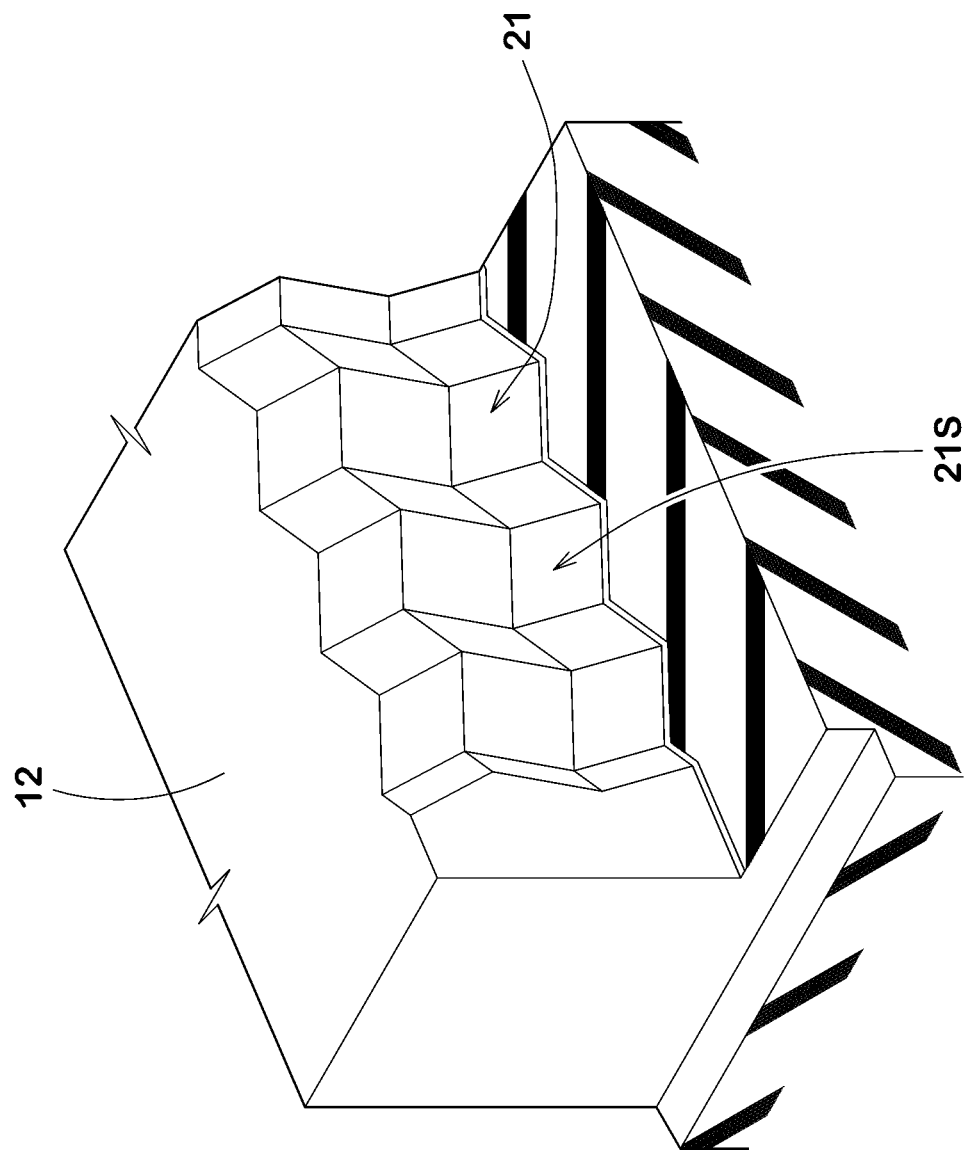
FIG. 6 is a conceptual perspective view of a three-dimensional sipe.

In this embodiment, each of the inner closed middle sipe 20i and the outer closed middle sipe 20o is configured as a three-dimensional sipe 21. Note that the three-dimensional sipe 21, as illustrated in FIG. 6, means a sipe that extends in a zigzag manner in the sipe longitudinal direction on the outer surface of the block and that also extends in a zigzag manner in the sipe depth direction. The three-dimensional sipe 21 as such has a pair of sipe walls 21S forming uneven surfaces which can engage firmly with each other upon grounding. Thus, the three-dimensional sipe 21 with a terminal end within the middle blocks 12 may be useful to maintain rigidity of the block, leading to improve steering stability on dry road condition and to suppress chunking while offering better edge effect.

Preferably, the depth D20 (not illustrated) of each of the inner closed middle sipe 20i and the outer closed middle sipe 20$o$ may be greater than the depth Db of the deep bottom portion 41, more preferably in a range of from 70% to 75% of the depth D1 of the first crown main groove 3.

Referring back to FIGS. 2 and 4, in this embodiment, the inner sipe element 18$i$ and the outer sipe element 18$o$ of the middle sipe 18, the inner closed middle sipe 20$i$ and the outer closed middle sipe 20$o$, the first inner inclined element 14$i$ and the first outer inclined element 14$o$ of the first middle lateral grooves 14 and the second inner inclined element 15$i$ and the second outer inclined element 15$o$ of the second middle lateral grooves 15 extend in parallel with each other.

As illustrated in FIG. 2, the crown land portion 7 is provided with a plurality of first crown lateral grooves 23 each extend from the first crown main groove 3 and terminate within the crown land portion 7. In this embodiment, each of the first crown lateral grooves 23, with respect to the tire axial direction, is inclined in an opposite direction to the first inner inclined element 14$i$ and the second inner inclined element 15$i$, and terminates within the crown land portion 7 without going beyond the tire equator C. Further, an opening end E23 at the first crown main groove 3 of each first crown lateral groove 23, in the tire axial direction, faces an opening end E13 at the first crown main groove 3 of each middle lateral groove 13.

Note that "the opening end E23 faces the opening end W13 in the tire axial direction" means the difference between the centers of the opening end E23 and the opening end E13 in the tire circumferential direction is equal to or less than 2.0 mm, more preferably equal to or less than 1.0 mm.

Since the opening ends E23 and E13 are arranged face to face with each other, a strong snow column may be formed by a combination of the first crown lateral grooves 23, the middle lateral grooves 13 and the first crown main groove 3, leading to improve driving performance on snow road condition. Preferably, each first crown lateral groove 23 may have an angle $\alpha 23$ which is greater than the angle $\alpha 14$, more preferably in a range of from 30 to 40 degrees with respect to the tire axial direction. The length L23 (not illustrated) in the tire axial direction of each first crown lateral groove 23 may preferably be in a range of from 20% to 25% of the width We of the crown land portion 7. The depth D23 (not illustrated) of each first crown lateral groove 23 may preferably be within a range of 100% plus/minus 5% of the depth Db of the deep bottom portion 41, more preferably in a range of from 65% to 75% of the depth D1.

Figure 7:
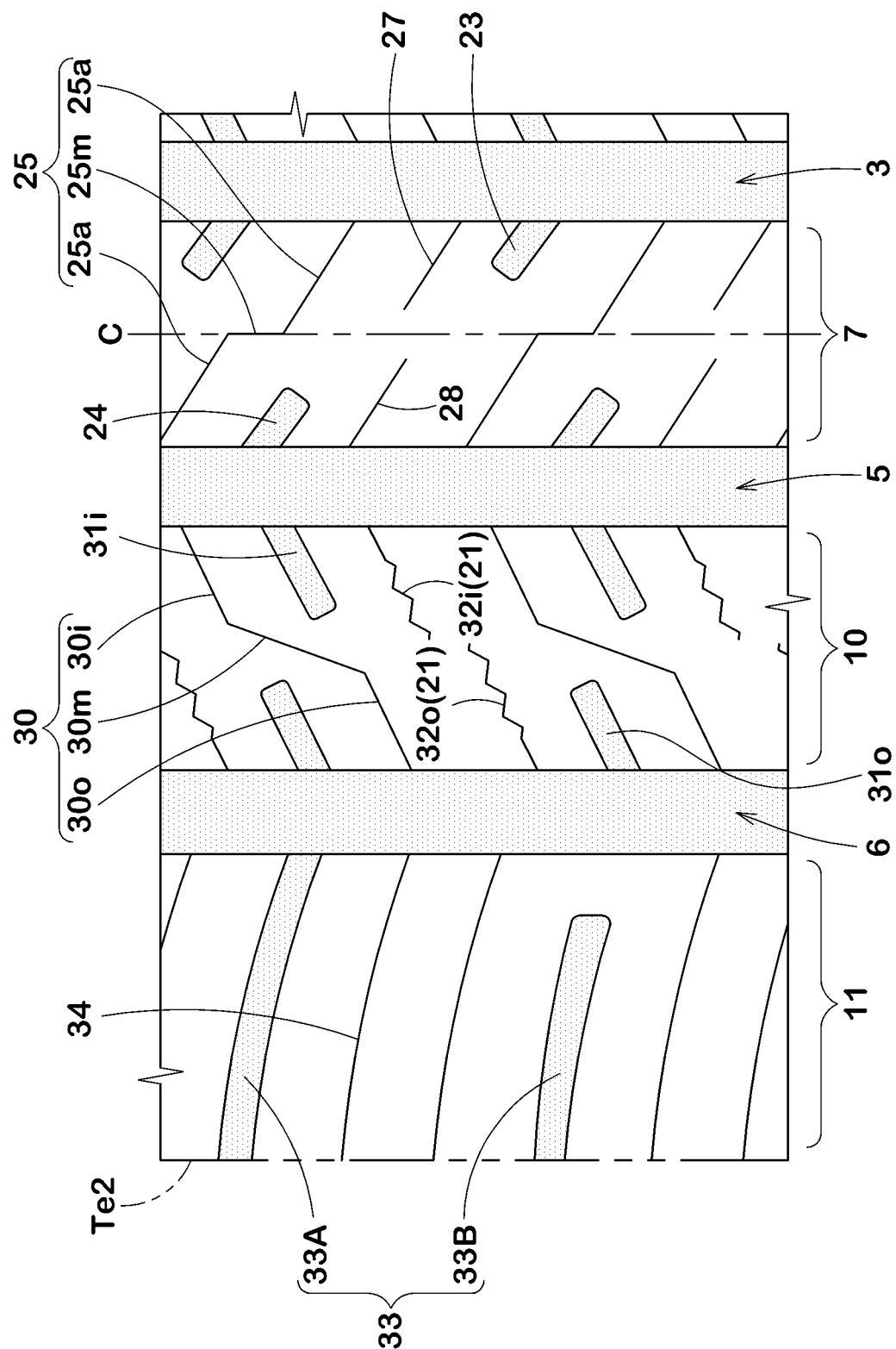
FIG. 7 is an enlarged view of a crown land portion, a second middle land portion and a second shoulder land portion.

As illustrated in FIG. 7, preferably, the crown land portion 7 may further be provided with a plurality of second crown lateral grooves 24 and/or a plurality of zigzag crown sipes 25 in addition to the first crown lateral grooves 23.

Each zigzag center sipe 25 includes a pair of end-side portions 25$a$ each extend from the first crown main grooves 3 or second crown main groove 5, and an intermediate portion 25$m$ connecting therebetween. The end-side portions 25$a$ are inclined in the same direction as the first crown lateral grooves 23. Further, the intermediate portion 25$m$ extends in parallel with the tire circumferential direction on the tire equator C.

The second crown lateral grooves 24 each extend from the second crown main groove 5 and are inclined in the same direction as the first crown lateral grooves 23. Further, each second crown lateral groove 24 terminates within the crown land portion 7. In this embodiment, one first crown lateral groove 23 and one crown lateral groove 24 are arranged in each region between zigzag crown sipes 25 which are arranged adjacently.

In this embodiment, the crown land portion 7 may further be provided with first closed sipes 27 and second closed sipes 28. Each first closed sipe 27 extends from the first crown main groove 3, and terminates within the crown land portion 7. Further, Each first closed sipe 27 is inclined in the same direction as the first crown lateral grooves 23. Each second closed sipe 28 extends from the second crown main groove 5, and terminates within the crown land portion 7. Further, each second closed sipe 28 is inclined in the same direction as the first crown lateral grooves 23. On the side of the first crown main groove 3, one first closed sipe 27, one crown lateral groove 23 and one zigzag center sipe 25 are arranged repeatedly in this order in one tire circumferential direction (e.g. below in FIG. 7). On the side of the second crown main groove 5, one second closed sipe 28, one second crown lateral groove 24 and one zigzag center sipe 25 are arranged repeatedly in this order in the other tire circumferential direction (e.g. above in FIG. 7).

In this embodiment, the end-side portions 25$a$ of the zigzag crown sipes 25, the first crown lateral groove 23, the second crown lateral grooves 24, the first closed sipes 27 and the second closed sipes 28 extend in parallel with each other.

In this embodiment, the second middle land portion 10 may be provided with middle sipes 30, inner middle lateral grooves 31$i$, outer middle lateral grooves 31$o$, inner closed middle sipes 32$i$ and outer closed middle sipes 32$o$.

Each middle sipe 30 includes an inner sipe element 30$i$ extending from the second crown main groove 5, an outer sipe element 30$o$ extending from the second shoulder main groove 6 and an intermediate sipe element 30$m$ connecting therebetween. The inner sipe element 30$i$, the outer sipe element 30$o$ and the intermediate sipe element 30$m$ are inclined in an opposite direction to the first crown lateral grooves 23.

The inner middle lateral grooves 31$i$ and the inner closed middle sipes 32$i$ each extend from the second crown main groove 5 with an inclination same as the middle sipe 30, and terminate within the second middle land portion 10. The outer middle lateral grooves 31$o$ and the outer closed middle sipes 32$o$ each extend from the second shoulder main groove 6 with an inclination same as the middle sipe 30, and terminate within the second middle land portion 10. In this embodiment, the inner closed middle sipes 32$i$ and the outer closed middle sipes 32$o$ are formed in a three-dimensional sipe 21 same as the inner and outer closed middle sipes 20$i$ and 20$o$.

On the side of the second crown main groove 5, one inner middle lateral groove 31$i$, one inner closed middle sipe 32$i$ and one middle sipe 30 are arranged repeatedly in this order in one tire circumferential direction (e.g. below in FIG. 7). On the side of the second shoulder main groove 6, one outer middle lateral groove 31$o$, one outer closed middle sipe 32$o$ and one middle sipe 30 are arranged repeatedly in this order in the other tire circumferential direction (e.g. above in FIG. 7).

In this embodiment, the inner and outer sipe elements 30$i$ and 30$o$ of the middle sipes 30, the inner middle lateral grooves 31$i$, the outer middle lateral grooves 31$o$, the inner closed middle sipes 32$i$ and the outer closed middle sipes 32$o$ extend in parallel with each other.

In this embodiment, the second shoulder land portion 11 is provided with shoulder lateral grooves 33 and shoulder sipes 34. The shoulder lateral grooves 33 include first shoulder lateral grooves 33A traversing the second shoulder land portion 11 completely and second shoulder lateral grooves 33B each having an inner end terminated within the second shoulder land portion 11. The first and second shoulder lateral grooves 33A and 33B may be arranged alternately in the tire circumferential direction. The shoulder sipes 34 each extend in parallel with the shoulder lateral grooves 33 and traverse the second shoulder land portion 11 completely.

As illustrated in FIG. 1, the first shoulder land portion 9 is provided with shoulder lateral grooves 36 and shoulder sipes 37. The shoulder lateral grooves 36 each traverse the first shoulder land portion 9 completely. The shoulder sipes 37 each extend in parallel with the shoulder lateral grooves 36, and traverse the first shoulder land portion 9 completely.

While the particularly preferable embodiments in accordance with the present invention have been described in detail, the present invention is not limited to the illustrated embodiments, but can be modified and carried out in various aspects.

Example

Pneumatic tires 215/60R16 having the basic tread pattern as illustrated in FIG. 1 were manufactured based on the details shown in Table 1. Then, driving performance on ice and snow road conditions, steering stability on dry road condition and durability (chunking resistance) of the test tires were tested. A reference example tire (Ref. 1) was also manufactured in such a manner that the first and second middle lateral grooves are formed in a straight manner which is inclined at the angle $\alpha 14$ in Table 1. The common specification of the tires and test procedures are as follows.

Rim size: 16×6J
Tire inner pressure: 240 kPa
Test vehicle: front wheel drive car with a 2400 cc displacement
Tire mounting location: all wheels Test for Driving Performance on Ice and Snow Road Conditions:

A necessary distance for accelerating the above test car from 5 km/h to 20 km/h on a snow and ice road conditions was measured using GPS on each test tire. The test results were shown in Table 1 using an index wherein the measurement of Ref. 1 is set to 100. The larger the value, the greater the performance is.

Test for Steering Stability on Dry Road Condition:

A test driver drove the test vehicle on a dry road to evaluate the steering stability based on his sense. The test results are shown in Table 1 using a score wherein the Ref. 1 is set to 100. The larger the score, the better the steering stability is.

Test for Durability (Chunking Resistance):

Under a constant room temperature condition, each test tire was inflated up to 180 kPa, and then was pushed onto a drum rotating at 120 km/h while increasing the tire load in a step manner to evaluate the durability. The test results are shown in Table 1 using a score wherein the Ref. 1 is set to 100. The larger the score, the better the durability is.

Table 1 shows the test results.

TABLE 1

| <First middle land portion> First middle lateral grooves | Ref. 1 | Ex. 1 | Ex. 2 | Ex. 3 | Ex. 4 | Ex. 5 |
|---|---|---|---|---|---|---|
| Shape | | straight | | | zigzag | |
| Angle $\alpha 14$ (deg.) | | | 65 | | | |
| Angle $\beta 14$ (deg.) | | 180 | | | 145 | |
| Depth ratio Da/D1 (%) | | 45 | | | 57.5 | |
| Depth ratio Db/D1 (%) | | 70 | | | 57.5 | |
| (Db − Da)/D1 (%) | | 25 | | | 0 | |
| Length ratio La/Wm (%) | 55 | 50 | | 55 | — | |
| Relationship of lengths La and Lb | La > Lb | La = Lb | | La > Lb | — | |
| Second middle lateral grooves | | straight | | | zigzag | |
| Relationship to first middle lateral grooves | point symmetric | same | | | point symmetric | |
| Middle sipes | presence | none (straight) | | | presence | |
| Angle $\alpha 18$ (deg.) | | | 55 | | | |
| Angle $\beta 18$ (deg.) | | 135 | | 180 | 135 | |
| Depth ratio D18/D1 (%) | | | 45 | | | |
| Depth ratio D42/D1 (%) | | | 70 | | | |
| Relationship of depths D18 and D42 | | | D18 < D42 | | | |
| Relationship of lengths Li, Lm and Lo | | | Li = Lm = Lo | | | |
| Inner and outer closed middle sipes | | presence (three-dimensional sipes) | | | | |
| Depth ratio D20/D1 (%) | | | 75 | | | |
| Driving performance on ice and snow | 100 | 130 | 130 | 130 | 122 | 118 |
| Steering stability on dry | 100 | 107 | 106 | 106 | 102 | 95 |
| Durability (chunking) | 100 | 120 | 110 | 110 | 102 | 105 |

As apparent from the test results, it is confirmed that the example tires improve steering stability on dry road condition and driving performance on ice and snow road conditions in a well balance manner.

What is claimed is:

1. A tire comprising:
   a tread portion being provided with a plurality of circumferentially extending main grooves comprising a crown main groove and a shoulder main groove to form a middle land portion therebetween;
   the middle land portion being provided with a plurality of middle lateral grooves to divide the middle land portion into a plurality of middle blocks; and
   the plurality of middle lateral grooves comprising a plurality of first middle lateral grooves and a plurality of second middle lateral grooves,
   wherein
   the plurality of first middle lateral grooves each comprises
   a first inner inclined element extending from the crown main groove and inclined with respect to a tire axial direction, a first outer inclined element having a length different from that of the first inner inclined element, and extending from the shoulder main groove and inclined with respect to the tire axial direction in a same direction as the first inner inclined element, and a first intermediate inclined element connecting the first inner inclined element with the first outer inclined element and inclined in an opposite direction to the first inner inclined element, the plurality of second middle lateral grooves each comprises a second inner inclined element extending from the crown main groove and inclined with respect to the tire axial direction in a same direction as the first inner inclined element, a second outer inclined element having a length different from that of the second inner inclined element, and extending from the shoulder main groove and inclined with respect to the tire axial direction in a same direction as the second inner inclined element, and a second intermediate inclined element connecting the second inner inclined element with the second outer inclined element and inclined in an opposite direction to the second inner inclined element, and wherein the first intermediate inclined element is located in such a manner as not to overlap with the second intermediate inclined element when the first intermediate inclined element is projected onto the second middle lateral groove that is adjacent to the first intermediate inclined element in the tire circumferential direction.

2. The tire according to claim 1, wherein the first inner inclined element is configured as a shallow bottom portion, and the first outer inclined element and the first intermediate inclined element each are configured as a deep bottom portion having a depth greater than that of the shallow bottom portion.

3. The tire according to claim 2, wherein the shallow bottom portion has a length (La) in the tire axial direction greater than a length (Lb) in the tire axial direction of the deep bottom portion.

4. The tire according to claim 2, wherein a difference (Db-Da) between a depth (Db) of the deep bottom portion and a depth (Da) of the shallow bottom portion is equal to or more than 15% of a depth (D1) of the crown main groove.

5. The tire according to claim 1, wherein
the second inner inclined element and the second intermediate inclined element are each configured so as to have a deep bottom portion, and
the second outer inclined element configured as a shallow bottom portion having a depth smaller than that of the deep bottom portion of the second inner inclined element and the second intermediate inclined element.

6. The tire according to claim 5, wherein the plurality of first middle lateral grooves and the plurality of second middle lateral grooves are arranged alternately in a tire circumferential direction.

7. The tire according to claim 5, wherein the plurality of second middle lateral grooves is formed in a point-symmetrical shape to the plurality of first middle lateral grooves.

8. The tire according to claim 5, wherein the shallow bottom portion has a length (La) in the tire axial direction greater than a length (Lb) in the tire axial direction of the deep bottom portion.

9. The tire according to claim 5, wherein a difference (Db-Da) between a depth (Db) of the deep bottom portion and a depth (Da) of the shallow bottom portion is equal to or more than 15% of a depth (D1) of the crown main groove.

10. The tire according to claim 1, wherein
at least one of the plurality of middle blocks is provided with a middle sipe traversing completely the at least one of the middle blocks,
the middle sipe comprising
an inner sipe element extending from the crown main groove and inclined with respect to the tire axial direction in a same direction as the first inner inclined element,
an outer sipe element extending from the shoulder main groove and inclined with respect to the tire axial direction in a same direction as the first outer inclined element and
an intermediate sipe element connecting the inner sipe element with the outer sipe element and inclined with respect to the tire axial direction in a same direction as the first intermediate inclined element, and
the intermediate sipe element has a depth shallower than depths of the inner sipe element and the outer sipe element.

11. The tire according to claim 10, wherein each of a length (Lo) in the tire axial direction of the outer sipe element and a length (Lm) in the tire axial direction of the intermediate sipe element is within a range of 100% plus/minus 5% of a length (Li) in the tire axial direction of the inner sipe element.

12. The tire according to claim 10, wherein
the at least one of the middle blocks is provided with
an outer closed middle sipe extending from the shoulder main groove along an extension line of the inner sipe element of the middle sipe and terminated within the at least one of the middle blocks and
an inner closed middle sipe extending from the crown main groove along an extension line of the outer sipe element of the middle sipe and terminated within the at least one of the middle blocks.

13. The tire according to claim 12, wherein the outer closed middle sipe and the inner closed middle sipe each are configured as a three-dimensional sipe.

14. The tire according to claim 12, wherein
the first inner inclined element is configured as a shallow bottom portion, and the first outer inclined element and the first intermediate inclined element each are configured as a deep bottom portion having a depth greater than that of the shallow bottom portion, and
the outer closed middle sipe and the inner closed middle sipe each have a depth greater than a depth (Db) of the deep bottom portion.

15. The tire according to claim 1,
the tread portion further comprising a crown land portion disposed inwardly in the tire axial direction of the middle land portion,
the crown land portion being provided with a plurality of crown lateral grooves each extending from the crown main groove and terminated within the crown land portion, and
each of opening ends of the plurality of crown lateral grooves at the crown main groove facing each of the opening ends of the plurality of middle lateral grooves at the crown main groove in the tire axial direction.

16. A tire comprising:
a tread portion being provided with a plurality of circumferentially extending main grooves comprising a crown main groove and a shoulder main groove to form a middle land portion therebetween;

the middle land portion being provided with a plurality of middle lateral grooves to divide the middle land portion into a plurality of middle blocks, wherein at least one of the plurality of middle blocks is provided with a middle sipe traversing completely the at least one of the middle blocks, the plurality of middle lateral grooves comprising a plurality of first middle lateral grooves and a plurality of second middle lateral grooves, wherein the plurality of first middle lateral grooves each comprises a first inner inclined element extending from the crown main groove and inclined with respect to a tire axial direction, a first outer inclined element extending from the shoulder main groove and inclined with respect to the tire axial direction in a same direction as the first inner inclined element, and a first intermediate inclined element connecting the first inner inclined element with the first outer inclined element and inclined in an opposite direction to the first inner inclined element, the plurality of second middle lateral grooves each comprises a second inner inclined element extending from the crown main groove and inclined with respect to the tire axial direction in a same direction as the first inner inclined element, a second outer inclined element extending from the shoulder main groove and inclined with respect to the tire axial direction in a same direction as the second inner inclined element, and a second intermediate inclined element connecting the second inner inclined element with the second outer inclined element and inclined in an opposite direction to the second inner inclined element, the second inner inclined element and the second intermediate inclined element each are a deep bottom portion, and the second outer inclined element is a shallow bottom portion having a depth smaller than that of the deep bottom portion of the second inner inclined element and the second intermediate inclined element, wherein the first intermediate inclined element is located in such a manner as not to overlap with the second intermediate inclined element when the first intermediate inclined element is projected onto the second middle lateral groove that is adjacent to the first intermediate inclined element in the tire circumferential direction, and the middle sipe comprises an inner sipe element extending from the crown main groove and inclined with respect to the tire axial direction in a same direction as the first inner inclined element, an outer sipe element extending from the shoulder main groove and inclined with respect to the tire axial direction in a same direction as the first outer inclined element, and an intermediate sipe element connecting the inner sipe element with the outer sipe element and inclined with respect to the tire axial direction in a same direction as the first intermediate inclined element.

* * * * *